United States Patent
Nebesnyi

(10) Patent No.: US 9,885,339 B2
(45) Date of Patent: Feb. 6, 2018

(54) HORIZONTAL AXIS TROPOSKEIN TENSIONED BLADE FLUID TURBINE

(71) Applicant: Valerii Nebesnyi, Kiev (UA)

(72) Inventor: Valerii Nebesnyi, Kiev (UA)

( * ) Notice: Subject to any disclaimer, the term of this patent is extended or adjusted under 35 U.S.C. 154(b) by 0 days.

(21) Appl. No.: 15/251,618

(22) Filed: Aug. 30, 2016

(65) Prior Publication Data

US 2016/0369773 A1    Dec. 22, 2016

Related U.S. Application Data

(63) Continuation of application No. 14/719,772, filed on May 22, 2015, now Pat. No. 9,441,615.

(51) Int. Cl.
| | | |
|---|---|---|
| *F03D 3/06* | (2006.01) | |
| *F03D 3/00* | (2006.01) | |
| *F03D 5/00* | (2006.01) | |
| *F03D 80/70* | (2016.01) | |
| *F03D 9/25* | (2016.01) | |

(52) U.S. Cl.
CPC ............ *F03D 3/061* (2013.01); *F03D 3/002* (2013.01); *F03D 3/062* (2013.01); *F03D 5/00* (2013.01); *F03D 9/255* (2017.02); *F03D 80/70* (2016.05); *F05B 2220/7068* (2013.01); *F05B 2240/212* (2013.01); *F05B 2240/2212* (2013.01); *F05B 2240/311* (2013.01); *F05B 2250/71* (2013.01); *Y02E 10/70* (2013.01); *Y02E 10/74* (2013.01)

(58) Field of Classification Search
CPC .......... F03D 11/04; F03D 3/062; F03D 11/02; F03D 3/002; F03D 3/005; F03D 3/061; F03D 3/064; F03D 7/06; F03D 13/20; F03D 9/255; F03D 80/70; F03D 5/00; F05B 2240/212; F05B 2240/311; F05B 2240/917; F05B 2240/2212; F05B 2220/7068; F05B 2250/71

See application file for complete search history.

(56) References Cited

U.S. PATENT DOCUMENTS

| | | | | |
|---|---|---|---|---|
| 1,835,018 A | | 12/1931 | Darrieus | |
| 4,151,424 A | * | 4/1979 | Bailey | F03D 3/002 290/43 |
| 4,329,116 A | * | 5/1982 | Ljungstrom | F03D 3/061 416/132 B |
| 4,514,145 A | * | 4/1985 | Wood | F03D 80/70 384/121 |

(Continued)

FOREIGN PATENT DOCUMENTS

FR          2927671 A1 *  8/2009  ............ F03D 3/002

*Primary Examiner* — Gregory Anderson
*Assistant Examiner* — Eldon Brockman
(74) *Attorney, Agent, or Firm* — Goodwin Procter LLP

(57) ABSTRACT

A fluid power-generating system operatively disposed between a first support and a second support, the system characterized by an absence of a centrally disposed rotor member, and including a machine capable of acting as a motor and as a generator, the machine coupled to the first support; a flexible wing(s) having an arcuate shape, a distal end coupled to the machine and a proximal end coupled to the second support, for catching and passing a flowing fluid; a tensioned balancing system coupled to the supports for stabilizing operation of the power-generating system; and a rigid strut(s) disposed between each flexible wing and the balancing system for supporting each flexible wing.

23 Claims, 11 Drawing Sheets

(56) References Cited

U.S. PATENT DOCUMENTS

| | | | |
|---|---|---|---|
| 5,183,386 A | 2/1993 | Feldman et al. | |
| 5,531,567 A * | 7/1996 | Hulls | F03D 3/062 |
| | | | 416/194 |
| 8,215,913 B2 * | 7/2012 | Lux | F03D 3/065 |
| | | | 416/195 |
| 9,046,073 B2 * | 6/2015 | Lux | F03D 3/005 |
| 9,169,828 B2 * | 10/2015 | Mangano | F03D 3/064 |
| 9,303,623 B2 * | 4/2016 | Wygnanski | F03D 3/061 |
| 9,441,615 B1 * | 9/2016 | Nebesnyi | F03D 11/04 |
| 2008/0008575 A1 | 1/2008 | El-Sayed | |
| 2008/0075595 A1 * | 3/2008 | Proven | F03D 3/064 |
| | | | 416/140 |
| 2008/0253889 A1 * | 10/2008 | Krivcov | F03D 3/005 |
| | | | 416/44 |
| 2008/0267777 A1 * | 10/2008 | Lux | F03D 3/065 |
| | | | 416/132 B |
| 2009/0285668 A1 * | 11/2009 | Labrecque | F03D 3/00 |
| | | | 415/8 |
| 2011/0070087 A1 * | 3/2011 | Attey | F03D 3/002 |
| | | | 416/178 |
| 2011/0236181 A1 * | 9/2011 | Wygnanski | F03D 3/061 |
| | | | 415/1 |
| 2012/0224968 A1 * | 9/2012 | Lux | F03D 3/005 |
| | | | 416/196 A |
| 2013/0156585 A1 * | 6/2013 | Mangano | F03D 3/064 |
| | | | 416/210 R |

* cited by examiner

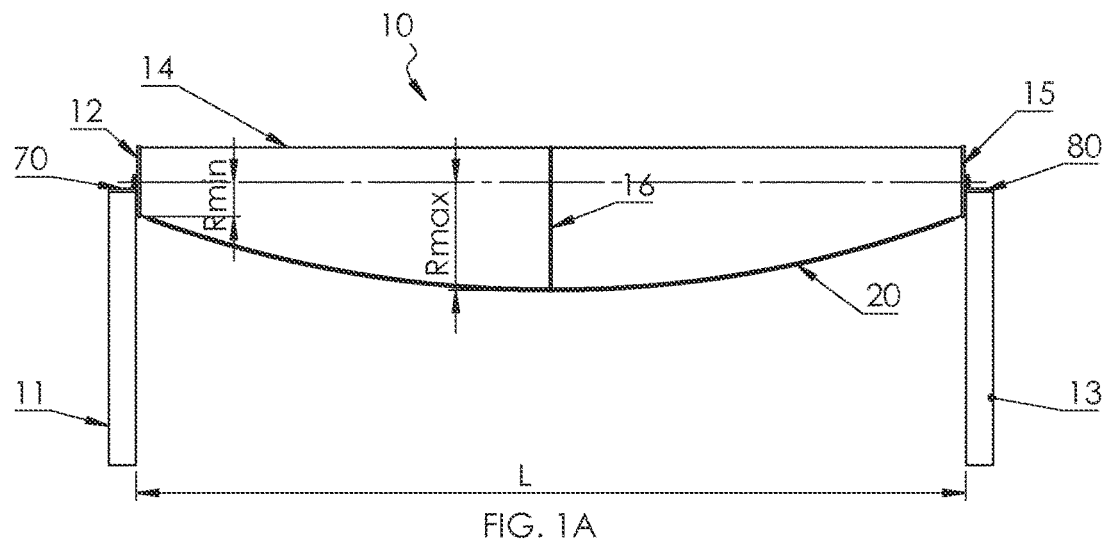
FIG. 1A
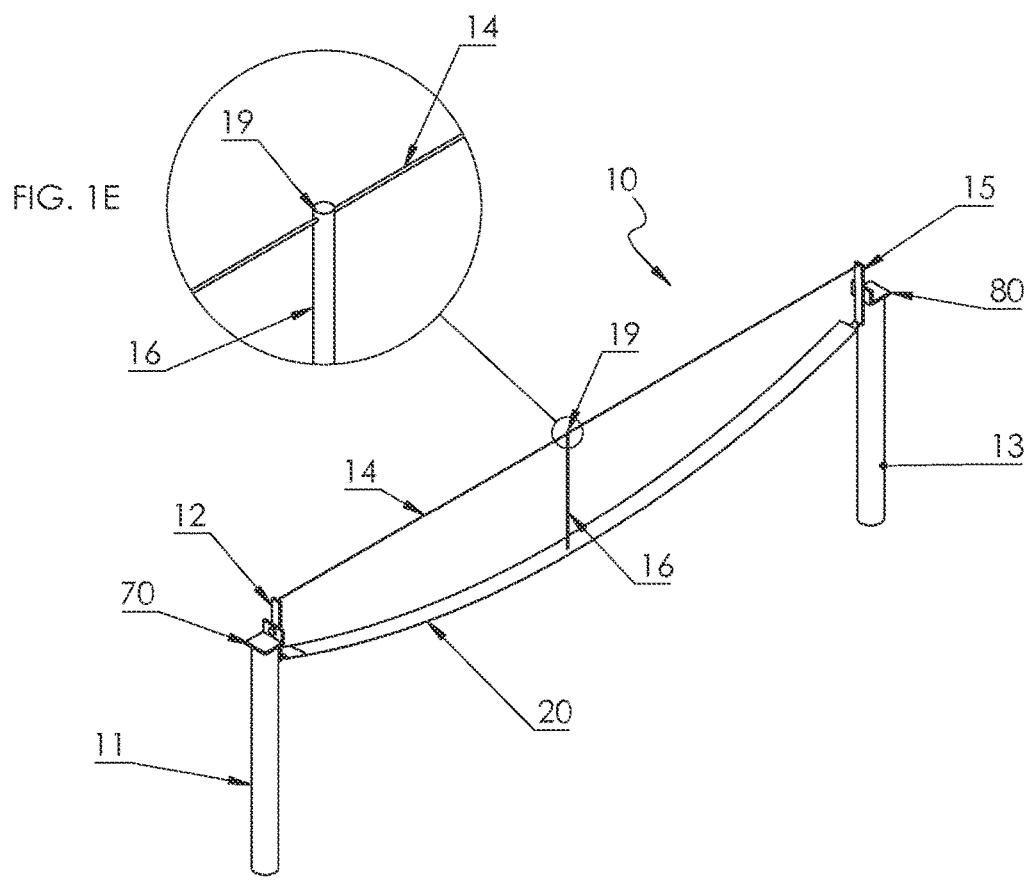
FIG. 1E
FIG. 1B

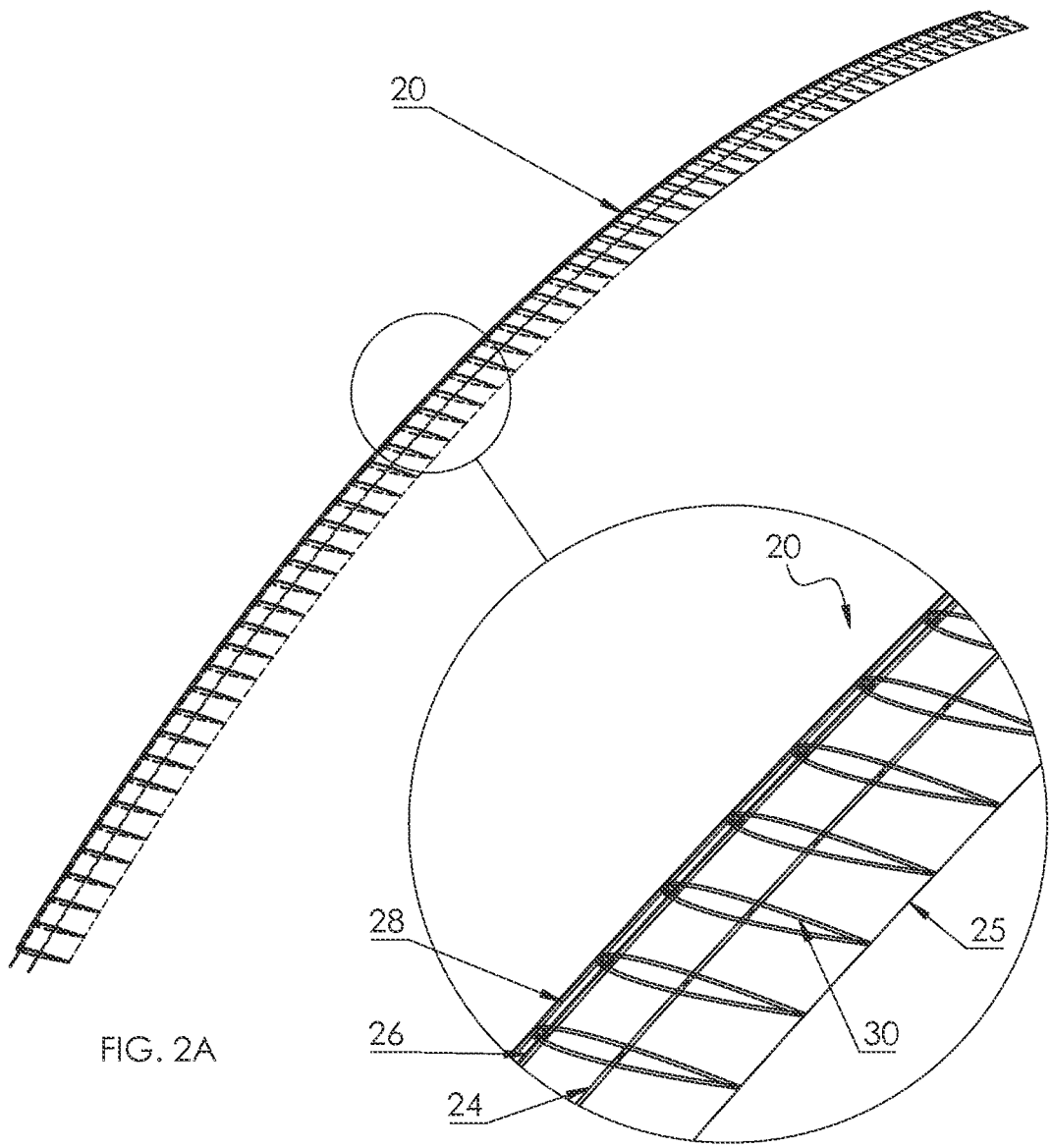

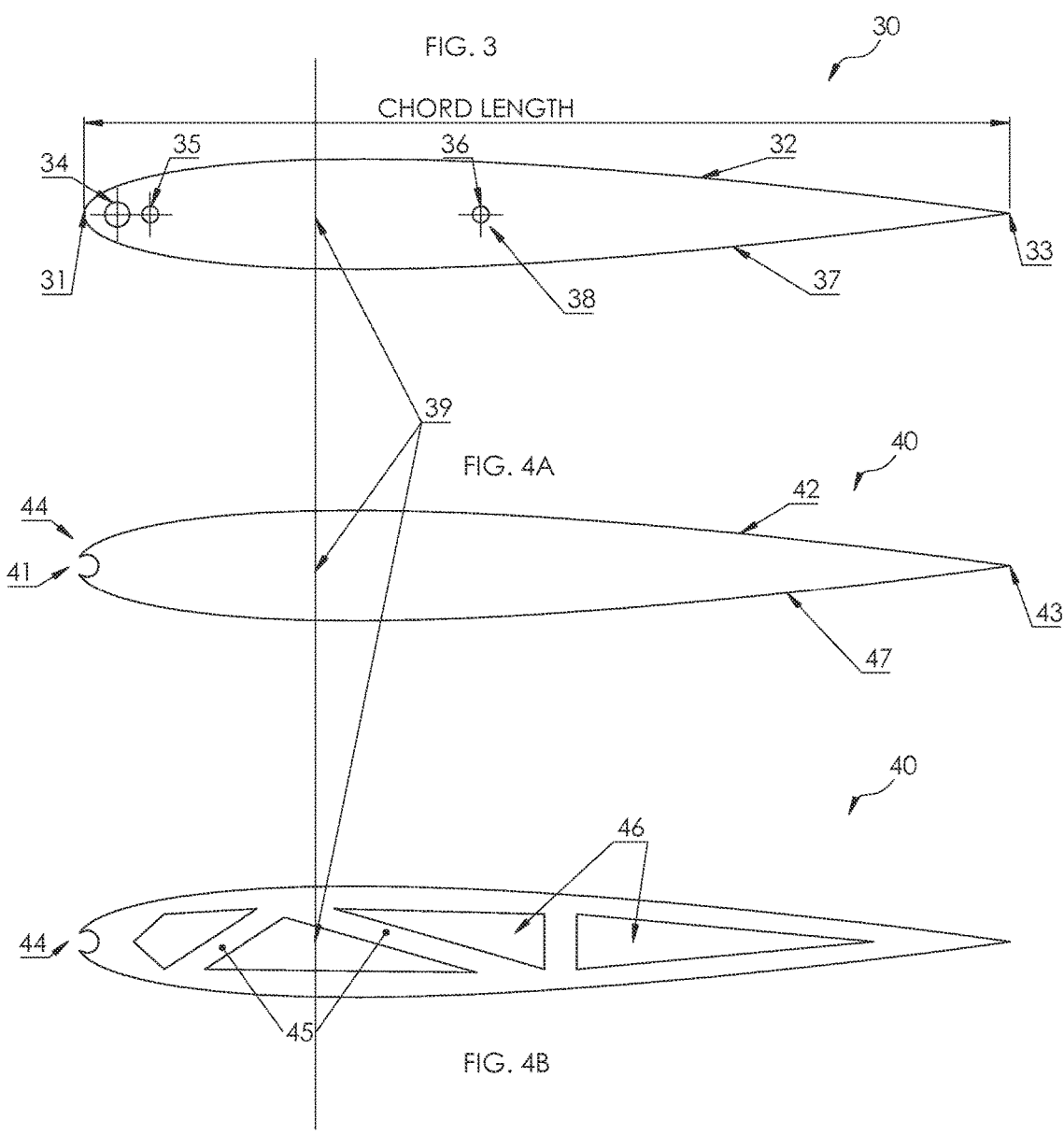

| Parameter | Typical | Notes |
|---|---|---|
| Support Height (m) | 12 | |
| Rotor Radius (m.) | 6 | |
| Support Distance (m.) | 48-50 | |
| Wing Weight (kg.) | 250 (single wing) 250 (dual wing) | Assume gusts of 70/m/s; same rotor solidity for each of the dual wings |
| RPM | 25-80 | |
| Average Annual Power (MWhrs.) | 90 – 98 | Assume 4 m/s |
| | 700 - 780 | Assume 8 m/s |
| Rated Power (kW) | 60 | Assume 8 m/s |
| | 7.5 | Assume 4 m/s |

FIG. 9

HORIZONTAL AXIS TROPOSKEIN TENSIONED BLADE FLUID TURBINE

CROSS-REFERENCE TO RELATED APPLICATIONS

This application is a continuation of and claims priority to and the benefit of U.S. patent application Ser. No. 14/719,772, filed May 22, 2015, which issued as U.S. Pat. No. 9,441,615, on Sep. 13, 2016, the disclosure of which is incorporated herein by reference in its entireties.

TECHNICAL FIELD OF THE INVENTION

This invention relates to Darrieus-type wind turbines and, more specifically, to a minimalistic design for a horizontal-axis turbine for use within a flowing fluid having reduced overall construction costs per kilowatt of useful energy generated.

BACKGROUND OF THE INVENTION

J. M. Darrieus originally designed a wind turbine having turbine blades, disposed about a vertical axis of rotation, that interact with external fluid flow to produce torque. The Darrieus wind turbine included a flying, curved blade mounted at the top and bottom of a vertical axle. Darrieus describes a myriad of vertical blade arrangements. In a variation of the original Darrieus designs and blade arrangements, vertically-oriented troposkein blades, having a central axis of rotation, have been built and used, e.g., in the Gaspé Peninsula, Quebec, Canada.

According to numerous use examples, classical Darrieus systems have never been able to compete in scale with propeller-type, horizontal axis wind turbines, which typically are more complex and expensive to build. Indeed, many wind turbines have been dismounted due to failures. Alternative devices have not been able to solve problems of energy conversion, start up, durability, and material inefficiencies.

SUMMARY OF THE INVENTION

Accordingly, it would be desirable to provide a horizontal-axis, fluid power-generating system using flexible wings with a troposkein shape.

In a first aspect, a fluid power-generating system, characterized by an absence of a centrally disposed rotor member, is operatively disposed between a first support and a second support. In some embodiments, the system includes a machine, which, in some variations, may include a gearbox, coupled to the first support and capable of acting as a motor and as a generator; an arcuate-shaped flexible wing(s) adapted to rotate about a substantially horizontal axis, whose distal end is coupled to the machine and whose proximal end is coupled to the second support, for catching and passing a flowing fluid; a tensioned balancing system coupled to the supports for stabilizing operation of the power-generating system; and a rigid strut(s), disposed between each flexible wing and the balancing system, for supporting each flexible wing.

In some variations, each flexible wing includes a number of airfoil-shaped profiles covered by a membrane. The airfoil-shaped profiles may form an opening therethrough and may be manufactured from a material such as wood, plastic, resins, composites, carbon materials, formed sheet metal, and the like. The membrane may be manufactured from a material such as flexible fabric, canvas, carbon fiber, sailcloth, para-aramid synthetic fiber, high-modulus polyethylene, ultra-high-molecular-weight polyethylene, thermoplastic polyethylene, rice paper, tissue paper, PTFE, liquid crystal polymer, and the like.

In some implementations, the system also may include a first cable disposed through an aperture proximate a leading edge of each airfoil-shaped profile, to orient and balance the flexible wing(s); and a second cable disposed through an aperture proximate a gravitational center of mass of the airfoil-shaped profile for transferring torque to the machine. In some variations, the second cable includes a pair of cables, each cable of the pair of cables passing through a respective aperture in each airfoil-shaped profile, substantially equidistant from an aerodynamic center of the airfoil-shaped profile. The cable may be manufactured from a material such as steel, wire rope, aramid fibers, liquid crystal polymer fibers, ultra-high-molecular-weight polyethylene fibers, and the like.

In some embodiments, the tensioned balancing system may include a tensioned cable and/or may include a second, arcuate-shaped flexible wing. In some implementations, the rigid strut(s) may be disposed substantially perpendicularly to each flexible wing at a respective connection point.

In a second aspect, a flexible wing having a gravitational center of mass and an aerodynamic center for use with a fluid power-generating system is disclosed. In some embodiments, the flexible wing includes a number of airfoil-shaped profiles, each having a chord length; a membrane covering the airfoil-shaped profiles; and a pair of cables passing through respective apertures, in each of the airfoil-shaped profiles, substantially equidistant from the aerodynamic center, wherein a first cable is disposed in a first aperture proximate the gravitational center of mass of each airfoil-shaped profile. In some variations, a second cable is preferentially located towards a leading edge of each airfoil-shaped profile. More specifically, the preferential location is in a range of up to about three (3) percent of the chord length closer to the leasing edge of each respective airfoil-shaped profile.

In some implementations, the airfoil-shaped profiles, which may form an opening therethrough, are made of a material such as wood, plastic, resins, composites, carbon materials, formed sheet metal, and the like. In some variations, the airfoil-shaped profiles may be smaller in at least one dimension that another of the airfoil-shaped profiles. In some implementations, the membrane is made of a material such as flexible fabric, canvas, carbon fiber, sailcloth, para-aramid synthetic fiber, high-modulus polyethylene, ultra-high-molecular-weight polyethylene, thermoplastic polyethylene, rice paper, tissue paper, PTFE, liquid crystal polymers, and the like.

In some embodiments, the flexible wing is preferentially weighted towards a leading edge of the flexible wing and may include a cable disposed through an aperture proximate the leading edge of each airfoil-shaped profile, to orient and balance the flexible wing. The cable may be manufactured from a material such as steel, wire rope, ultra-high-molecular-weight polyethylene fibers, aramid fibers, liquid crystal polymer fibers, and the like.

In a third aspect, a method of generating power with a system disposed between a first and a second support characterized by an absence of a centrally disposed rotor member, using a flowing fluid and an arcuate-shaped flexible wing(s) is disclosed. In some embodiments, the method includes providing a machine capable of acting as a motor and as a generator on the first support, coupling the machine to a distal end of a tensioned cable(s) disposed within the flexible wing(s), exposing the flexible wing(s) to the flowing fluid to drive the machine, and stabilizing the flexible wing(s) with a rigid strut(s) disposed between the flexible wing(s) and a tensioned balancing system, e.g., a second flexible wing.

In some implementations, the flexible wing(s) may include a number of airfoil-shaped profiles and a membrane covering the airfoil-shaped profiles.

In some variations, the method further includes orienting and/or balancing the system, by disposing a balancing cable through an aperture proximate, a leading edge of each airfoil-shaped profile; and transferring torque to the machine by the cable(s) disposed through an aperture in each airfoil-shaped profile. In some implementations, the cable(s) includes a pair of cables passing through respective apertures in each of the airfoil-shaped profiles, substantially equidistant from the aerodynamic center of each airfoil-shaped profile, wherein a first cable is disposed in a first aperture proximate a gravitational center of mass of each airfoil-shaped profile. In other variations, the method includes preferentially locating a second cable towards a leading edge of each airfoil-shaped profile.

BRIEF DESCRIPTION OF THE DRAWINGS

Further features, embodiments, and advantages of the present invention will become apparent from the following detailed description with reference to the drawings, in which:

FIG. 1A shows a view of an illustrative embodiment of a fluid power-generating system having a single flexible wing and a balancing system in accordance with some aspects of the present invention;

FIG. 1B shows a perspective view of the fluid power-generating system of FIG. 1A;

FIG. 1E shows a detail of an illustrative embodiment of a connection between the balancing system and a rigid strut of FIG. 1B in accordance with some aspects of the present invention;

FIG. 2A shows a partial view of a flexible wing in accordance with some embodiments of the present invention;

FIG. 2B shows a detail of a section of the flexible wing of FIG. 2A in accordance with some embodiments of the present invention;

FIG. 3 shows a view of an illustrative embodiment of an airfoil-shaped profile for use with multiple cables in accordance with the present invention;

FIG. 4A shows a view of a second illustrative embodiment of an airfoil-shaped profile for use with a single cable in accordance with the present invention;

FIG. 4B shows a view of a third illustrative embodiment of the airfoil-shaped profile of FIG. 4A for use with a single cable in accordance with the present invention;

FIG. 9 provides a table of illustrative design parameters.

DETAILED DESCRIPTION

Torque Transfer

Given two opposing wheels, each of radius R, interconnected at the periphery of each wheel by a single, tensioned wire of length L and subject to a horizontal tension force (H) and torque (T) applied to one wheel, while the other wheel is braked, that causes a displacement angle (α) between the points of attachment of the tensioned wire on the first and on the second wheel, torque transferred between the opposing wheels may be approximated by the equation:

$$T=H/L*R^2*\sin(\alpha).$$

This equation becomes the starting point for producing electrical power using transferred torque created by a flexible wing having no central shaft or another means to synchronize the opposing wheels. From the general equation, one can see that if the radius, R, were reduced to zero, torque transferred also would be equal to zero. Hence, to maximize torque, the distance from the center of the rotor to the center of the flexible wing, $R_{max}$, may be lengthened. Thus, for instances in which a working or flowing fluid, e.g., wind, transfers energy to a rotor, torque transfer may work even better, as fluid forces may be distributed along the entire length of the flexible wing. For ease of discussion, moving forward, it will be assumed that the working or flowing fluid is air (wind). However, the invention is not to be construed as being limited to air (wind) and any flowing liquid or gaseous phase may be utilized. Per the equation, torque is at a maximum when the displacement angle, a, equals 90 degrees; but, once the displacement angle strays higher or lower from 90 degrees, torque decreases.

Use of a single flexible wing (without a central rigid strut and without a balancing cable) may, however, produce significant bending stresses on bearings in the machine, i.e., a motor-generator, at the supports, as well as result in low torque transferred, due to the minimal wing radius, R. Attaching each end of the flexible wing to a respective motor-generator installed on each of the supports may synchronize motion. However, moderate to severe parasitic vibrations could make such a structure fragile. Indeed, a single flexible wing without a counter-balancing system may act more like an oscillator, producing undesirable contraction and extension waves along the wire length when R=0 and producing excessive tensile forces and bending moment if connected off-axis, i.e., R>0.

Fluid Power-Generating System Using a Single Troposkein Flexible Wing

Figure 1C:
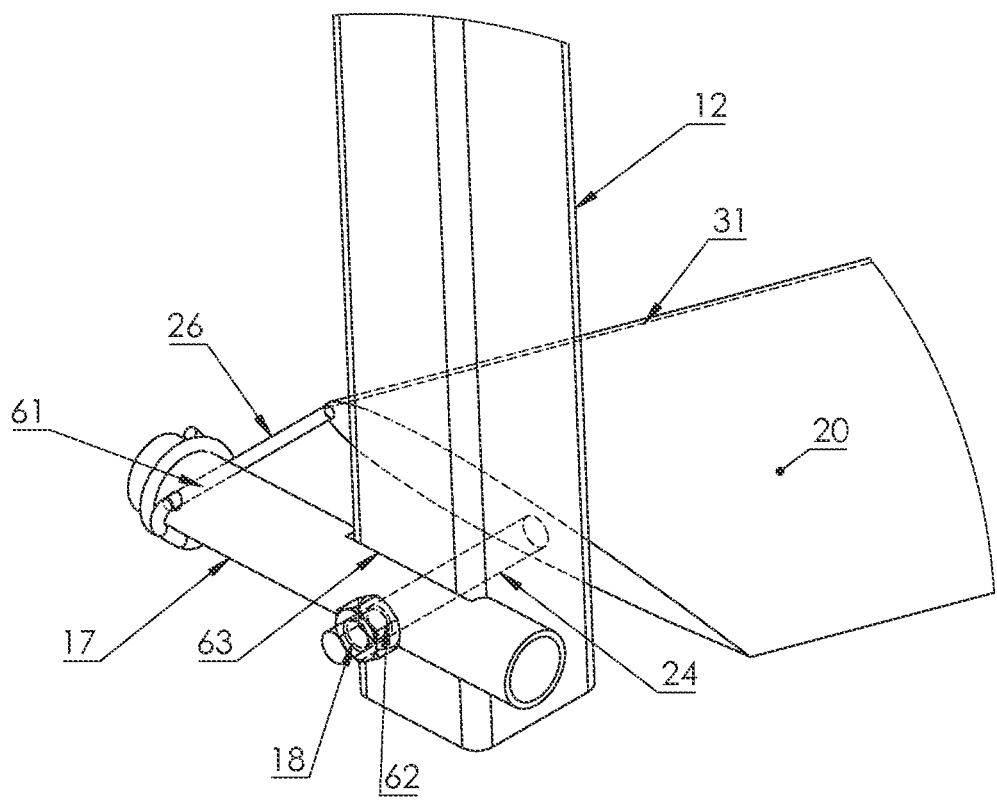
FIG. 1C shows a detail of an illustrative embodiment of a connection between the flexible wing of FIG. 1A and a wing support in accordance with some aspects of the present invention.

Referring to FIGS. 1A and 1B, combining a troposkein, arcuate-shaped flexible wing 20 with a balancing system, e.g., a tensioned balancing cable 14, may provide a particularly useful system 10 for harvesting, i.e., generating, energy from a flowing fluid. In some embodiments, the embodied fluid power-generating system 10 may be disposed between and supported by a first elongate support 11 and a second elongate support 13 that are spaced a distance L apart. The distance L between supports may be estimated as a function of the maximum wing radius, $R_{max}$. Typically, distances L between about 2 and about 10 times the maximum wing radius are suitable. Although distances larger than about 10 times the maximum wing radius are possible, they may result in higher tension loads that would require additional structural and dimensional features of the elongate supports 11, 13.

The elongate supports 11, 13 are designed to be substantially vertical and stiff enough to resist, without deleterious deflection towards the flexible wing, the tensile load of the balancing cable 14 as well as the tensile and bending loads generated while the flexible wing 20 is being driven by a flowing fluid. The height of the elongate supports 11, 13 may be selected to provide sufficient ground clearance, which is governed by federal and state regulations (e.g., about 6 meters above ground surface in an agricultural setting), for the flexible wing 20 when it is rotating at a maximum wing radius, $R_{max}$. For example, in one implementation, each of the elongate supports 11, 13 may be about 10 to 12 meters high with a maximum wing radius, $R_{max}$, of about 5 to 6 meters, leaving a ground clearance of about 5 to 6 meters. For a 12-meter tall support 11, 13 and a 6-meter maximum wing radius, a distance between supports of about 48 to 50 meters may be envisioned. Taller supports 11, 13 increase construction costs as support construction scales as a cube of the maximum wing radius, $R_{max}^3$, rather than as a square of the same, $R_{max}^2$, for other portions of construction.

Respective proximal ends of each of the balancing cable 14 and the flexible wing 20 may be releasably attached to a first wing support 12, which may be disposed at the first support 11, while respective distal ends of each of the balancing cable 14 and the flexible wing 20 may be releasably attached to a second wing support 15, which may be disposed at the second support 13. For example, referring to FIG. 1C, an illustrative embodiment of a method of releasably attaching one end of a flexible wing 20 to the first wing support 12 is shown. As will be discussed in greater detail below, a second tensioned cable 24 and a third tensioned cable 26 extend internal to and along the entire length of the flexible wing 20. In some variations, the third cable 26, which is preferentially disposed towards the leading edge 31 of the flexible wing 20, may be releasably attached to a distal end of a bar 17, e.g., by threading the strands of the third cable 26 through an aperture 61 formed through the distal end of the bar 17, by rolling the free-running ends of the cable strands several times around the distal end of the bar 17, and by weaving some of the free-running ends of the cable strands between the rolled turns. In some variations, the bar 17 may be a solid or a hollow cylinder, made of metal, an alloy, and the like, that is fixedly attached to, e.g., by welding, and supported by the first wing support 12. In one implementation, a portion 63 of the bar 17 may be cut out to provide a recessed area for receiving the first wing support 12. The second cable 24, which is disposed proximate the gravitational center of mass 38 of each of the airfoil-shaped profiles 30 forming the flexible wing 20, may be releasably attached to the bar 17, e.g., by threading the second cable 24 through an opening formed in the first wing support 12 and an aperture 62 formed through the bar 17 and attaching a retaining nut 18 to the end of the cable 24. At the other end of the first wing support 12, in some variations, the balancing cable 14 may be releasably attached to the first wing support 12 in a similar manner as the second cable 24, e.g., by threading the second cable 24 through another opening formed in the first wing support 12 and attaching a retaining nut 18 to the end of the cable 24. With such an arrangement, during operation, the cables 26, 24 may transfer forces to the bar 17, which applies a moment to the first wing support 12, causing the first wing support 12 to rotate. Respective distal ends of each of the balancing cable 14 and the flexible wing 20 may be similarly attached to a second wing support 15.

Figure 1D:
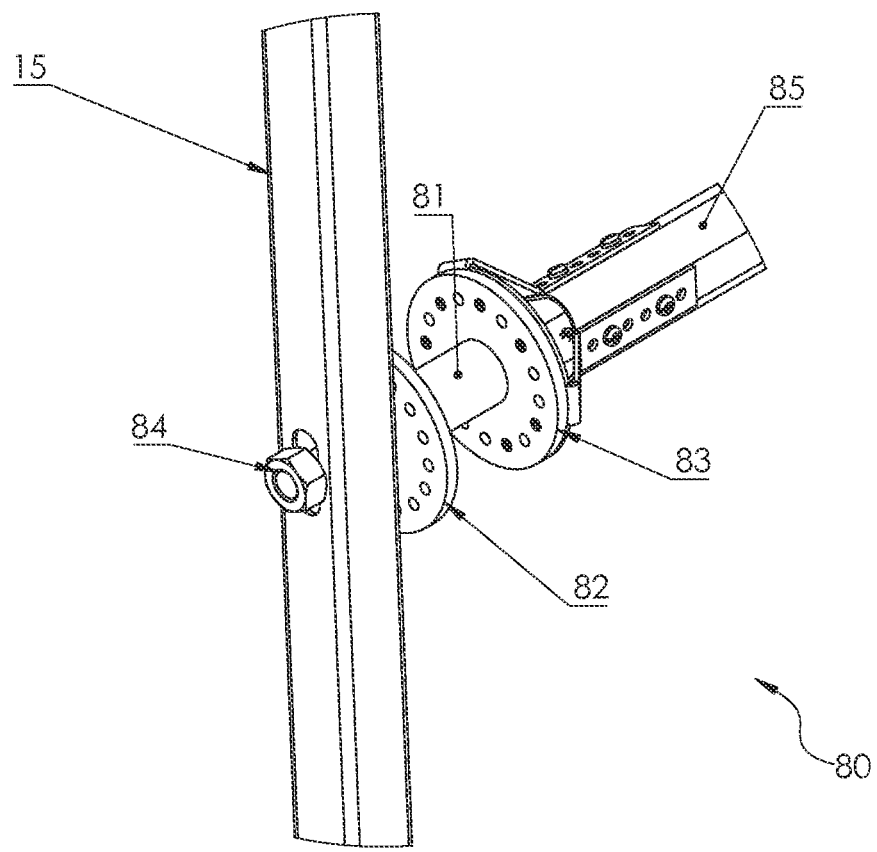
FIG. 1D shows a perspective view of the connection between the wing support and the bearing assembly in accordance with some aspects of the present invention.

At the first support 11, the first wing support 12 may be removably attached and operatively coupled to a machine 70 (FIG. 7A), e.g., a motor-generator (such as a synchronous permanent magnet (PM) motor wheel) and, in some instances, to a gearbox associated with the machine 70. Based on available wind, a motor-generator 70 with a gearbox may be tuned to a fixed frequency. Advantageously, with such a gearbox, rotation speed of the flexible wing 20 may be fixed, which may reduce costs and simplify overall construction. The structure and function of the machine 70 will be described in greater detail below. At the second support 13, the second wing support 15 may be removably attached and operatively coupled to a bearing assembly 80 (FIG. 1D). Optionally, both wing supports 12, 15 may be removably attached and operatively coupled to a respective machine 70. A single, asynchronous machine 70 may be designed to operate at a fixed frequency and without an inverter, enabling the user to couple the machine 70 directly to a power grid. If a pair of machines 70 is used, however, the machines 70 may have to be synchronous, e.g., to address instances in which the machines 70 may pull reactive power through the rotor, and may also require more complex power conditioning electronics, adding cost.

Referring to FIG. 1D, an illustrative embodiment of a method of releasably attaching the second wing support 15 to the bearing assembly 80 is shown. In some implementations, at the centroid of the second wing support 15, a first portion 82 may be releasably attached to the second wing support 15, e.g., using a nut and bolt 84. A rotatable shaft 81 may be disposed between the first portion 82 and a second portion 83. At one of the first portion 82 and the second portion 83 the rotatable shaft 81 is supported by a bearing, e.g., a series of ball bearings in a race. At the other of the first portion 82 and the second portion 83, the rotatable shaft 81 is fixedly attached. As a result, rotation of the flexible wing 20 may cause the rotatable shaft 81 to rotate within the bearing, without transferring torque from the first portion 82 to the second portion 83. A non-rotatable shaft 85 may be fixedly attached to the second portion 83 for the purpose of attaching the second portion 83 to the second support 13.

The tensioned balancing cable 14 may be manufactured of wire rope, ultra-high-molecular-weight polyethylene fibers, steel, aramid fibers, liquid crystal polymer fibers, and the like and may be pre-tensioned with a tensile force that is approximately equal to an estimated tension force of the operating flexible wing 20. Estimated tensile force strengths may range between about 0.5 and 2 times the centrifugal force, depending on the length L between supports 11, 13. With proper material selection, this requirement may be met automatically, keeping in mind that, as the flexible wing 20 rotates, the wing 20 tries to pull the inner radius closer. This increases the tension of the balancing cable 14, which pulls back on the flexible wing 20. As revolution speeds of the flexible wing 20 (and balancing cable 14) increase, centrifugal forces and tensile forces also increase. Resonance frequencies also may move higher, so that they exceed the main system frequency. This minimizes unwanted resonance, as tensioned wing resonance remains above main motion frequencies.

In some implementations, connecting one or more rigid struts 16 or rods, which may be manufactured of hardened aluminum alloys, carbon fiber composites, high-strength steel, and the like, to the flexible wing 20 and to the balancing cable 14 may be advantageous. Indeed, connecting rigid struts 16 to the flexible wing 20 and to the balancing cable 14, inter alia, prevent damage to the flexible wings 20 when it twists. For example, during operating conditions in which the flexible wing 20 is subject to relative twisting (torsion), the rigid struts 16 experience compression, making the system 10 more robust against torsion and, more specifically, preventing the flexible wing 20 from twisting beyond the location of the struts 16. Moreover, connecting a rigid strut(s) 16 to the flexible wing 20 and to the balancing cable 14, e.g., at a midpoint between the two opposing wing supports 12, 15, ensures that the torque transferred begins to decrease after 180 degrees of angular displacement rather than 90 degrees.

With a rigid strut 16 installed, using a balanced cable 16 and a flexible wing 20 having a maximum wing radius, $R_{max}$, of about 15 meters, and assuming that the minimum wing radius, $R_{min}$, equals one-half of $R_{max}$, it is possible to transfer full power torque from one side of the turbine system 10 to the other side at displacement angles less than 90 degrees. This effectively means that distributed torque transfer from the flexible wing 20 to the motor-generator 70 would require less angular displacement.

Those of ordinary skill in the art can appreciate the benefits and costs of adding additional struts 16. The first strut 16 adds the most significant improvement to the system 10, while each additional strut 16 adds additional improvement, but the significance of the improvement decreases with each additional strut 16. Disadvantageously, struts 16 also add aerodynamic drag, weight, and cost.

FIG. 1E shows a detail of an exemplary method of attaching the rigid strut 16 to the balancing cable 14. As shown, the rigid strut 16 and the balancing cable 14 may be substantially perpendicular to each other; although, when more than a single strut 16 is used, the plural struts may be connected to the balancing cable 14 at an angle less than about 90 degrees. Although there are a number of ways to connect a rigid strut 16 to a cable 14, in some implementations, the balancing cable 14 may be disposed through an opening 19 formed in the rigid strut 16. An integrated clamp, internal to the rigid strut 16, i.e., within the opening 19, may be used for securing the balancing cable 14.

Figure 1F:
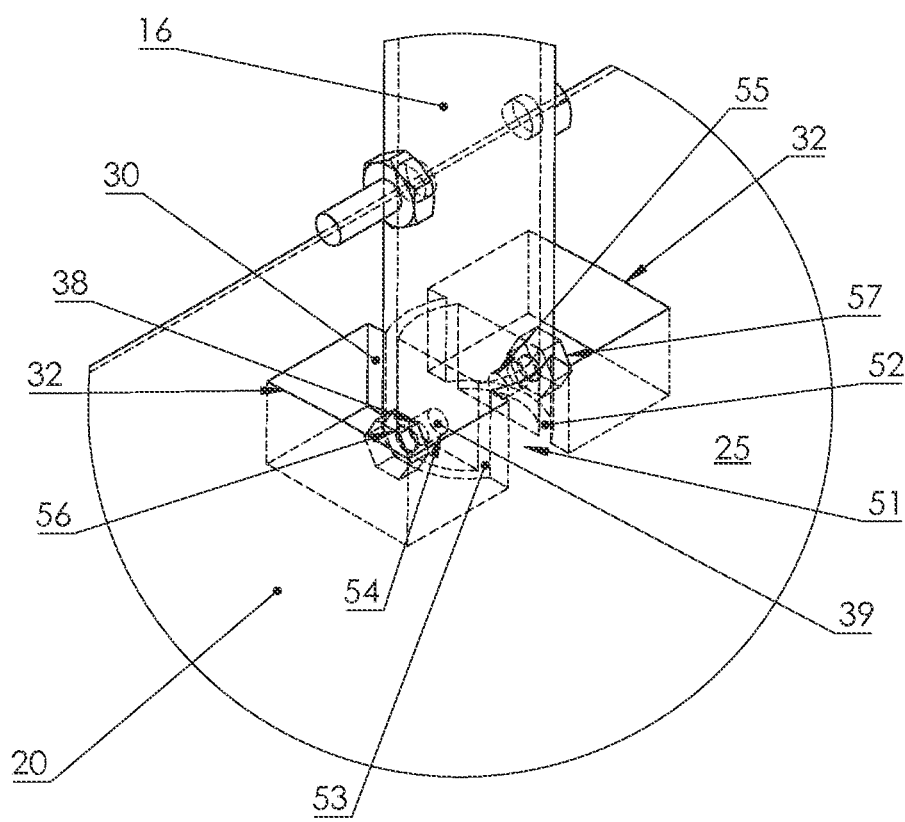
FIG. 1F shows a detail of an illustrative embodiment of a connection between the flexible wing and the rigid strut of FIG. 1B in accordance with some aspects of the present invention.

FIG. 1F shows a detail of an exemplary method of attaching the rigid strut 16 to the flexible wing 20. In some embodiments, a channel 51 may be formed through the center of the end of the rigid strut 16, forming two opposing strut end portion 52, 53. In some variations, the width of the channel 51 may be selected to fit, e.g., snugly, around the width of an airfoil-shaped profile 30. Apertures 54 may be formed in each of the strut end portions 52, 53, while an aperture 55 may also be formed in the airfoil-shaped profile 30 at the aerodynamic center 39. In some implementations, a fastening device, e.g., a bolt, a rivet, and the like may be inserted through the apertures 54, 55. For illustrative purposes only, FIG. 1F shows a nut 57 and bolt 56 combination fastening device.

Referring to FIGS. 2A and 2B, a flexible, tensioned, troposkein wing 20 for catching and passing a flowing fluid and for rotating about a substantially horizontal axis is shown. Advantages of the instant flexible wing 20 over prior art systems include its flexibility and tensioning, as well as elimination of the need for a centrally disposed rotor member in the system 10. The tensioned flexible wing 20 may be structured and arranged with an arcuate shape when subjected to fluidic loading and may include a plurality of airfoil-shaped profiles 30 (FIG. 3) that are covered by a flexible membrane 25. In some implementations, the airfoil-shaped profiles 30 may be fixedly attached, e.g., using glue, rivets, welding, etc., to the membrane 25. In some implementations, the profiles 30 are made from wood, plastic, resins, composites, carbon materials, and formed sheet metal. In some variations, the airfoil-shaped profiles 30 may be uniformly sized or be made in various incremental sizes, e.g., smaller in at least one dimension than an adjacent airfoil-shaped profile 30. In some implementations, the membrane is made of flexible fabric, canvas, carbon fiber, sailcloth, para-aramid synthetic fiber, high-modulus polyethylene, ultra-high-molecular-weight polyethylene, thermoplastic polyethylene, rice paper, tissue paper, PTFE, and liquid crystal polymers.

In some variations, the airfoil-shaped profiles 30 may have substantially the same dimensions, e.g., chord length, width, thickness, and the like, across the entire length of the flexible wing 20; however, in other variations, some of the airfoil-shaped profiles 30, e.g., those disposed proximate the midpoint, may have smaller dimensions than other airfoil-shaped profiles 30, e.g., those disposed proximate the wing supports 12, 15 where the rotor tip speed (TSR) is lower. For example, a Darrieus-type total chord length (TCR) for an airfoil-shaped profile 30 may be estimated using the following equation:

$$TCR = \frac{4.3 * R}{(TSR)^2}$$

in which R is the wing radius and TSR refers to the rotor tip speed, i.e., the difference between the linear speed of the wing and wind speed. If there are two flexible wings, the TCR would be halved; with three wings, the TCR would be divided by three (3), etc.

The center-to-center distance between adjacent airfoil-shaped profiles 30 may be substantially the same or may be varied, e.g., so that profiles 30 are closer proximate the wing supports 12, 15 and further apart proximate the mid-point of the flexible wing 20. Those of ordinary skill in the art can appreciate that, in design, any number of variations of center-to-center spacing versus the quantity and dimensions of the airfoil-shaped profiles 30 can be selected to achieve substantially the same result.

Referring to FIG. 3, an illustrative embodiment of an airfoil-shaped profile 30 is shown. Each airfoil-shaped profile 30 may include a leading edge 31, a trailing edge 33, and upper 32 and lower peripheral surfaces 37. Each airfoil-shaped profile 30 has a chord length, an aerodynamic center 39, and a gravitational center of mass 38. Advantageously, at least one opening 34, 35, 36 may be formed through each airfoil-shaped profile 30. Corresponding cables 28, 26, 24 may be disposed through the respective openings 34, 35, 36 formed through each airfoil-shaped profile 30. The diameter of the openings as well as the diameters of the cables 28, 26, 24 may be subject to design requirements, such as close sliding fits.

For example, a first opening 34 proximate the leading edge 31 of each airfoil-shaped profile 30 may be formed to accept a first, balancing weight cable 28 for the purpose of orienting and balancing the flexible wing 20. In some variations, the diameters of the first opening 34 and the first cable 28 may be larger, respectively, than the diameters of the other openings 35, 36 and the cables 26, 24. The balancing weight cable 28 is not designed to transfer any forces; hence, it remains un-tensioned and a bit relaxed. The weight of the first cable 28 and, hence, its diameter, may be selected to substantially match the weight of the airfoil-shaped profile 30. In some variations, it may be desirable to locate the first opening 34 on an airfoil-shaped profile 30 so that a center of mass of the airfoil-shaped profile 30, which, as a rule of thumb, may be a distance of about 42 percent of the chord length from the leading edge 31, is, instead, a distance of about 25 percent of the chord length from the leading edge 31. More particularly, it may be desirable to locate the first opening 34 on an airfoil-shaped profile 30 so that the center of mass of the airfoil-shaped profile 30 is coincident with the aerodynamic center 39 of the airfoil-shaped profile 30, which may be a distance that is between about 20 and about 30 percent of the chord length from the leading edge 31. Alternatives to disposing a balancing weight cable 28 as described above, may include replacing the cable 28 with a semi-rigid plate, e.g., that flexes easily in a radial direction but that transfers loads in a tangential direction along the flexible wing 20 to the wing supports 11, 13 and/or arranging the airfoil-shaped profile 30 and/or ribs within the flexible wing 20 to shift the center of mass to the desired location, e.g., coincident with the aerodynamic center 39. The latter alternative may be accomplished at the time of manufacture, e.g., by injection molding of the profiles 30. With either alternative, the balancing weight cable 28 may also be replaced with a light-weight, high strength rope.

A second opening 36 may be formed at the gravitational center of mass 38 of the airfoil-shaped profile 30. The second opening 36 may be formed to accept a second cable 24 for the purpose of transferring torque to the first wing support 12. A third opening 35 may also be formed at a location that it is substantially the same distance, i.e., equidistant, from the aerodynamic center 39 of the airfoil-shaped profile 30 as the gravitational center of mass 38, i.e., the second opening 36. The third opening 35 may be formed to accept a third cable 26 also for the purpose of transferring torque to the first wing support 12. In some implementations, the third opening 35 may be preferentially located, e.g., preferentially weighted, towards the leading edge 31 of each airfoil-shaped profile 30. In some variations, the preferential location may be in a range of up to about three (3) percent of the chord length closer to the leading edge 31 of each respective airfoil-shaped profile 30. In other variations, the preferential location may be in a range of 1 to 1.5 percent of the chord length closer to the leading edge 31 of each respective airfoil-shaped profile 30.

Preferential weighting may produce the following advantages: the flexible wing 20 may flex and remain close to a zero (0) degree angle of attack and aerodynamic momentum turns the flexible wing 20 about the location. By balancing aerodynamic momentum with tension forces in the two cables 26, 24, which are separated by the profiles 30, it is possible to further reduce parasitic drag in parts of Darrieus rotor trajectories where actually no energy is produced. Accordingly, with such a design, it may be possible to achieve exceptional optimization of attack angle versus speed of rotor.

The diameters of the second 24 and third cables 26 may be approximated by estimating the centrifugal force and by setting the maximum tension force equal to the product of the centrifugal force and a variable. The variable may be about 1.2 (if the distance between supports is less than four (4) maximum wing radii), about 2 (if the distance between supports is less than eight (8) maximum wing radii), or about 2.4 (if the distance between supports is less than ten (10) maximum wing radii).

Although the embodiment has been described in terms of two cables 26, 24 for transferring torque, those of ordinary skill in the art can appreciate that torque transfer may also be accomplished using a single cable. However, the advantages of using two cables 26, 24, which may include greater stability and balancing, may outweigh the advantages of a single cable embodiment.

Although the cables 28, 26, 24 can be steel wires, if larger flexible wings 20 are desired, to reduce weight, cables 26 and 24 may be manufactured from, for example, lightweight ultra-high-weight polyethylene fibers, while only the frontal cable 28 may be made of steel to act as ballast. It is important to note that, when rigid blades are used in other applications, it is problematic to achieve stable wing performance within different operating conditions without adding ballast. Indeed, without balancing the wings 20, e.g., using the frontal cable 28, the system 10 may suffer and tend to increase attack angles in a manner contrary to resisting its motions.

An alternative embodiment of an airfoil-shaped profile 40 is shown in FIGS. 4A and 4B. Each alternative airfoil-shaped profile 40 includes a leading edge 41, a trailing edge 43, and upper 42 and lower peripheral surfaces 47. Whereas the first embodiment of an airfoil-shaped profile 30 (FIG. 3) may include a plurality of openings 34, 35, 36 for a corresponding plurality of cables 28, 26, 24, the alternative airfoil-shaped profile 40 may have a single opening 44 that may be disposed at the leading edge 41. Such an alternative may be more difficult to balance as balancing the tension in the membrane 25 with the tension of the single cable, each of which may be made from a different material, is a difficult task. Furthermore, such an alternative embodiment may result in a lighter structure, which is not necessarily beneficial. For example, if the mass of the flexible wing 20 is too light, the wind may move the flexible wing 20 around so that it does not follow the optimum trajectory for extracting power. For example, a rule-of-thumb, minimum weight for the flexible wing 20 may be about $0.13R^2$ (in kg per linear meter of wing).

To reduce the weight of the flexible wing 40 further, each alternative airfoil-shaped profile 40 may be structured and arranged similar to a truss (FIG. 4B), in which there are load-carrying members 45 as well as cut-out section 46. Those of ordinary skill in the art can appreciate that the airfoil-shaped profile 30 may also be designed using a truss concept. Here again, such an embodiment may result in a lighter structure and, consequently, if the mass of the flexible wing 20 is too light, the wind may move the flexible wing 20 around so that it does not follow the optimum trajectory for extracting power.

Multiple-Wing Power-Generating System

Some benefits of a single, flexible wing system 10 with a balancing cable 14 include that it can be fully stopped and that the mass of the wing is greater than the mass of remainder of the system 10 structure. Advantageously, when completely stopped and not operating, the single, flexible wing system 10 may withstand significant wind gusts, e.g., 70 meters/second, that other structures comprising similar material could not. For locations in which significant wind gusts are not or less of a concern and/or where a preferred condition may include a symmetric look, less vibrations, and/or less torque ripple, one or more additional flexible wings may be added. Advantageously, a second flexible wing may replace the balancing cable 14.

Figure 5A:
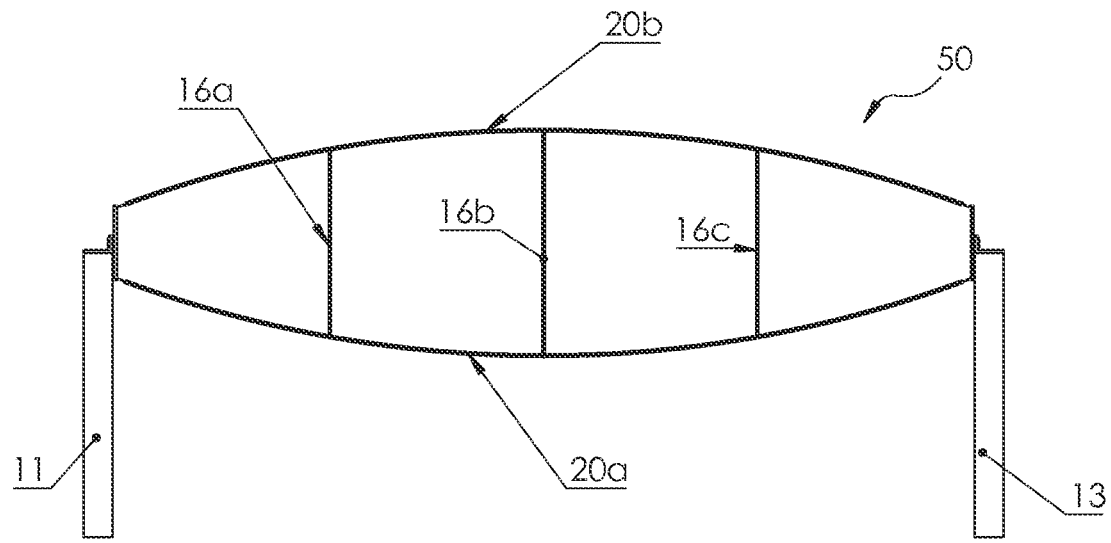
FIG. 5A shows a view of an illustrative embodiment of a fluid power-generating system having multiple flexible wings and multiple rigid struts in accordance with some aspects of the present invention.
Figure 5B:
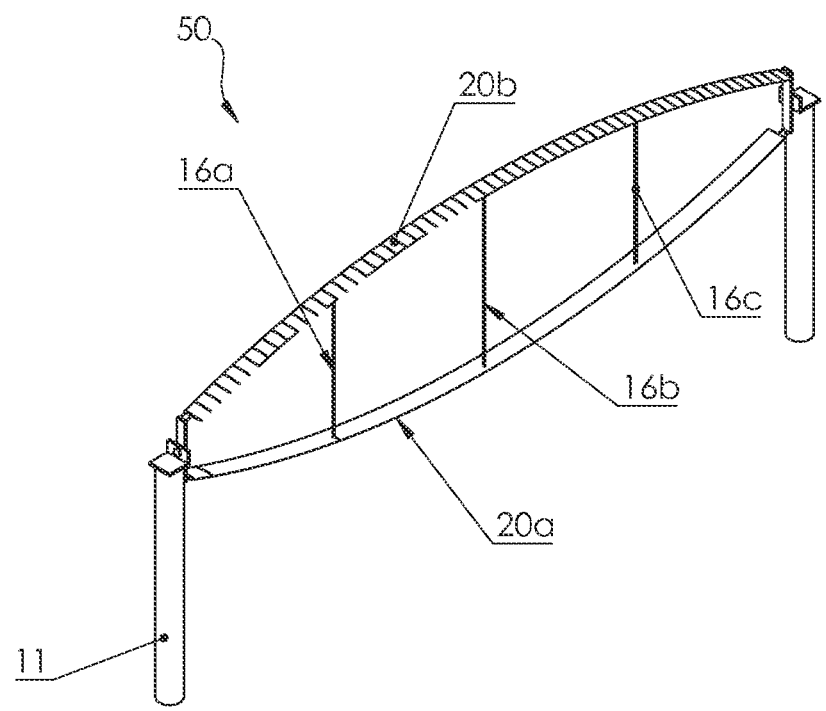
FIG. 5B shows a perspective view of the fluid power-generating system of FIG. 5A.
Figure 6A:
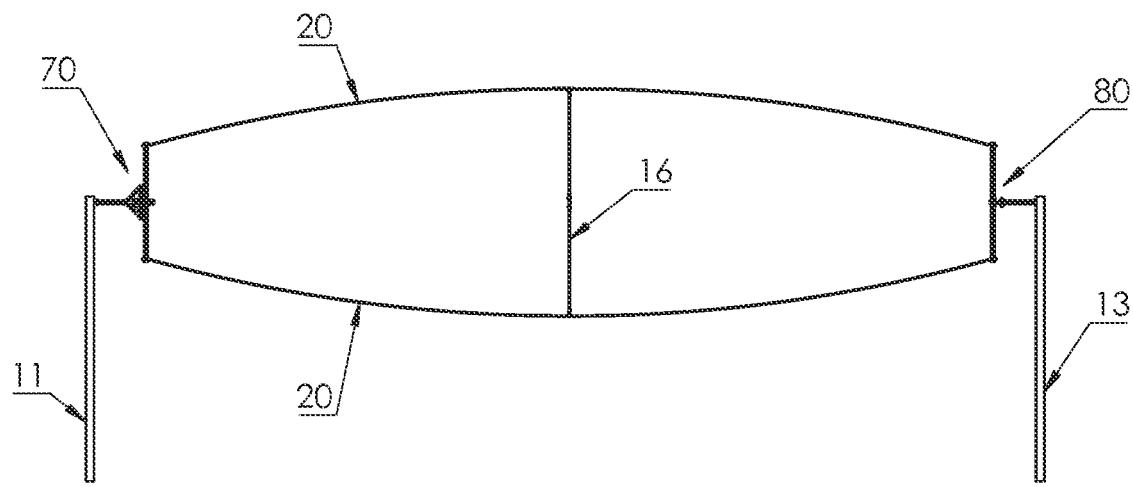
FIG. 6A shows a view of an illustrative embodiment of the support connections of a fluid power-generating system having multiple flexible wings in accordance with some aspects of the present invention.
Figure 6B:
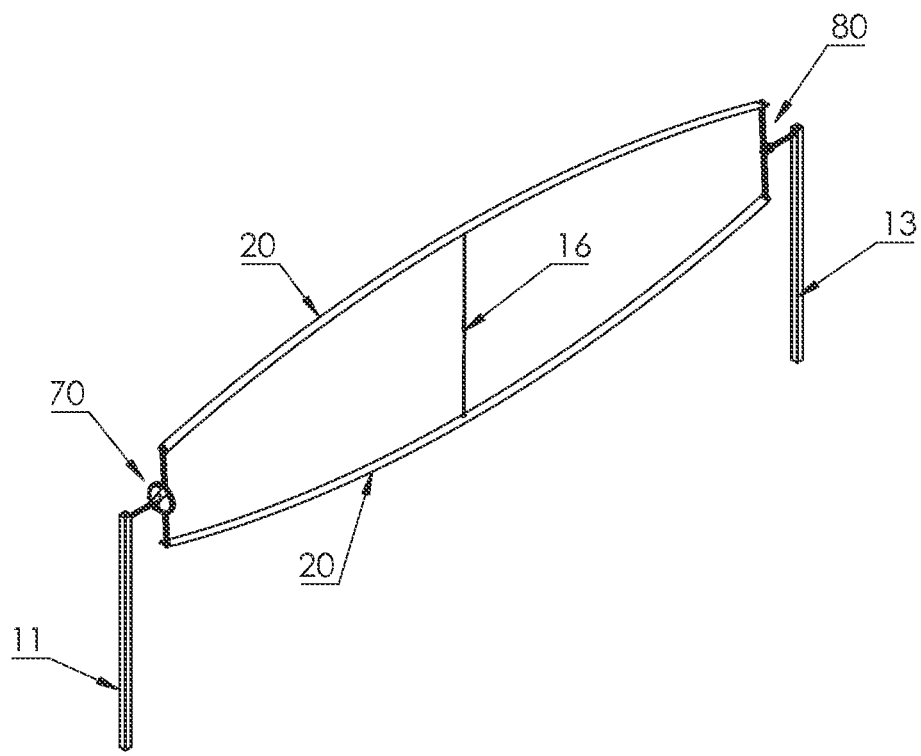
FIG. 6B shows a perspective view of the fluid power-generating system of FIG. 6A.

Referring to FIGS. 5A and 5B, an illustrative embodiment of a dual-wing system 50 is shown. Such a system 50, having two opposing flexible wings 20a, 20b, may form a symmetrical and substantially balanced structure. Although a three-wing system may provide even smoother motion and better balance than the dual-wing version 50, such advantages and benefits come at the expense of increased structure complexity and cost. The number of rigid struts 16a-16c, each of which increases aerodynamic resistance, for a multi-wing system 50 may be more than one, depending on design targets. Notwithstanding, three rigid struts 16a-16c, equally spaced (L/4) between the supports 11, 13, provide an effective and efficient system 50. The designer, however, may choose to allow some bending (with fewer struts) to achieve even smoother wing movement and less torque oscillation. In comparison to horizontal axis bladed-systems, the multi-wing system 50 may increase the swept area 3 to 4 times, providing more power and, advantageously, operating at wind speeds that otherwise would be outside of the operation range of propeller-driven wind turbines.

The design and structure of the flexible wings 20a, 20b of multi-wing system 50, as well as the design and structure of the connection between the flexible wings 20a, 20b and the rigid struts 16a-16c and the design and structure of the connection between the flexible wings 20a, 20b and the wing supports 12, 15, may be substantially similar to those previously described in connection with the flexible wing and balancing cable embodiment 10. A primary difference between the two systems 10, 50 may be the number of rigid struts 16.

Figures 8A, 8C:
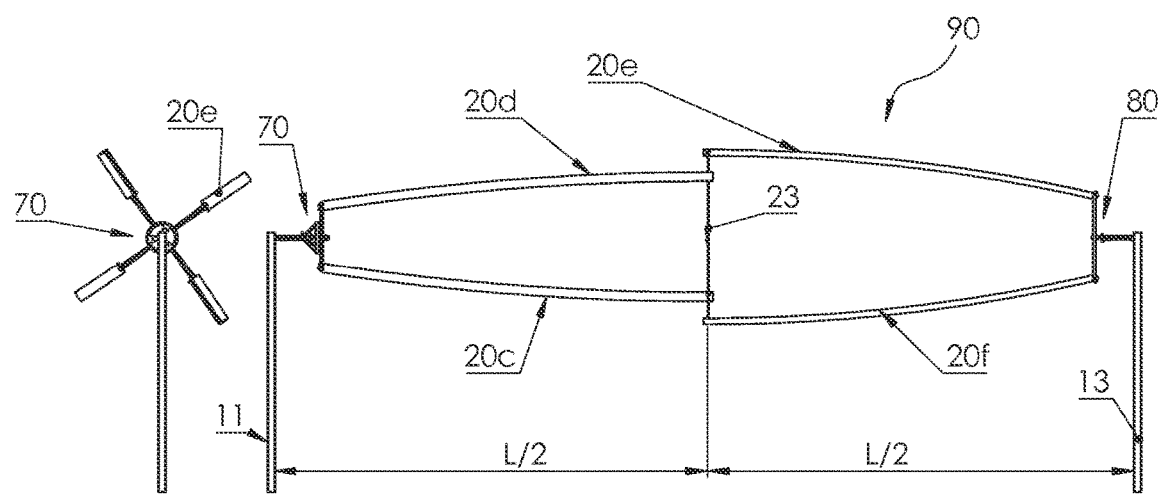
FIG. 8A shows a view of another illustrative embodiment of a fluid power-generating system having multiple flexible half wings and a T-shaped cross strut in accordance with some aspects of the present invention.
FIG. 8C shows an end view of the fluid power-generating system of FIG. 8A.
Figure 8B:
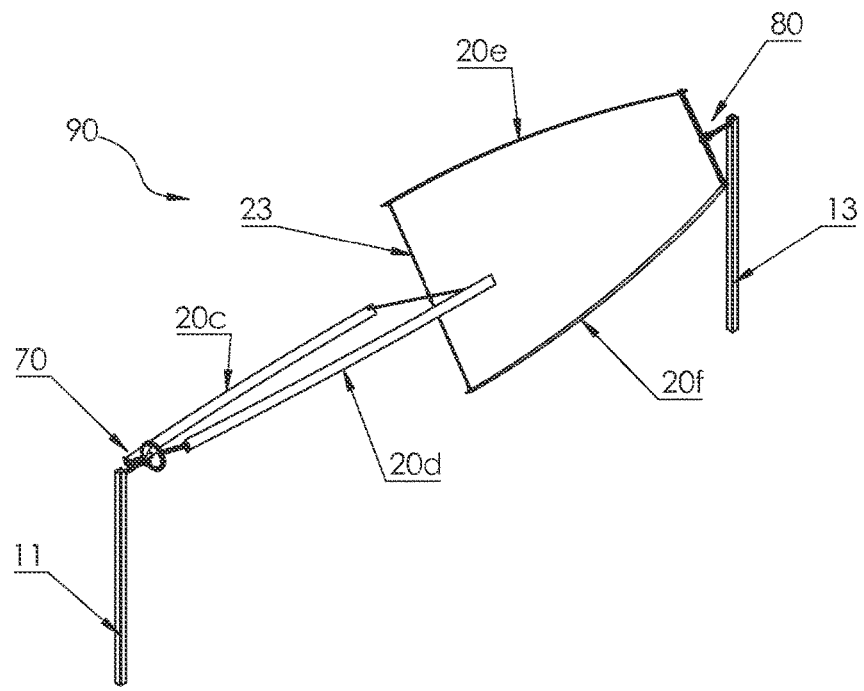
FIG. 8B shows a perspective view of the fluid power-generating system of FIG. 8A.

In yet another embodiment, referring to FIGS. 8A through 8C, a power-generating system 90 having two pairs of half wings 20c, 20d and 20e, 20f, whose distal ends are attached to a cross strut 23, e.g., a T-shaped cross strut, and which are skewed 90 degrees at midlength (L/2), is shown. The cross strut 23 and skewing the pairs of half wings 20c, 20d and 20e, 20f reduce vibrations and bending moments at the supports 11, 13 as, with every rotation, torsional forces are distributed better, reducing torque ripple. Although a skewing angle of 90 degrees is described, those of ordinary skill in the art can appreciate that, in other implementations, the system 90 may include more than two pairs of half wings, with a cross strut structured and arranged to be attached to the distal ends of each of the flexible wings in each of the pairs and an appropriate skewing angle.

In some variations, the third cable 26 of each of the multiple half wings 20c, 20d, 20e, 20f may be releasably attached to a distal end of one of the rods making up the cross strut 23, e.g., by threading the strands of the third cable 26 through an aperture formed through the distal end of the respective rod, by rolling the free-running ends of the cable strands several times around the distal end of the respective rod, and by weaving some of the free-running ends of the cable strands between the rolled turns. The second cable 24, which is disposed at the gravitational center of mass 38 of each of the airfoil-shaped profiles 30 forming each half wing 20c, 20d, 20e, 20f, may be releasably attached to the respective rod of the cross strut 23, e.g., by threading the second cable 24 through an aperture 62 formed through the respective rod of the cross strut 23 and attaching a retaining nut 18 to the end of the cable 24.

Operation

Operation of the flexible wing and balancing cable system 10 of FIG. 1A and of the dual-wing system of FIG. 5A and a method of generating power with the systems 10, 50 will now be described. An illustrative, hybrid power-generating system 60 shows the major structural elements of the two systems 10, 50 and will be referred to in this description.

Recall that each flexible wing 20 of the embodied systems 60 is supported at a distal and proximal end by a first 11 and a second support 13 and that each wing 20 may include plural, e.g., three (3), cables 28, 26, 24, of which, one, un-tensioned cable 28 may be provided for the purpose of balancing the light-weight structure and at least one, tensioned cable 26, 24 may be used to actually transfer force to a machine 70. In some variations, the second cable 24 may be disposed proximate the gravitational center of mass 39 of each of the airfoil-shaped profiles 30, which provide structure and a load-carrying capability to the flexible wing(s) 20. When two cables 26, 24 are used, their midpoint may be proximate the aerodynamic center 39 of each of the airfoil-shaped profiles 30. However, the distance between cable 26 and the aerodynamic center 39 of each of the airfoil-shaped profiles 30 may be preferentially weighted towards the leading end 31 of the airfoil-shaped profile 30.

The membrane 25 may be fixedly attached to each of the airfoil-shaped profiles 30 to form the flexible wing 20. Advantageously, a portion of the cable 26, 24 may also pretension the membrane 25, enabling the membrane 25 to maintain an aerodynamic shape, especially in places where there are no airfoil-shaped profiles 30. Some important properties of a flexible wing 20 may include radial flexibility, i.e., when coupled to a machine 70, and greater rigidity when bent tangentially.

In some embodiments, in a first step, the method includes providing a machine 70 capable of acting as a motor and as a generator on the first support 11. In some implementations, in a next step, the distal ends of each tensioned cable(s) 26, 24 disposed within the flexible wing(s) 20, may be releasably attached to a first wing support 12, while the proximal ends of each tensioned cable(s) 26, 24 disposed within the flexible wing(s) 20, may be releasably attached to a second wing support 15. Attachment of the respective ends of the cables 26, 24 to wing supports 12, 15 has been discussed previously and will not be discussed further. Similarly, attachment of the second wing support 12 to the bearing assembly 80 at the second support 13 has already been discussed in detail.

Figure 7A:
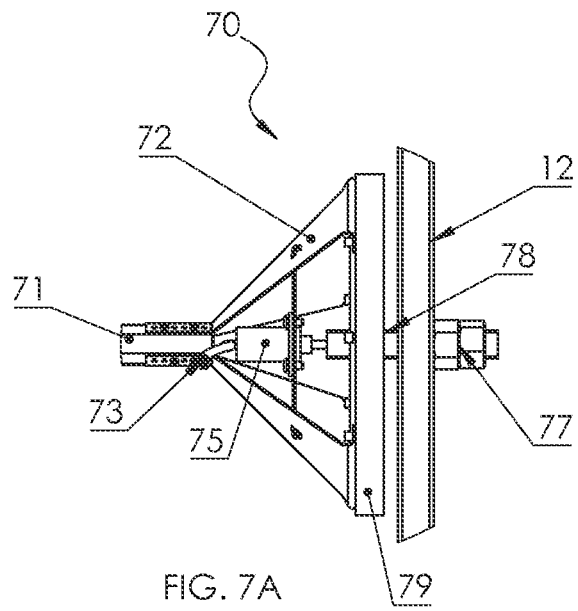
FIG. 7A shows a side view of an illustrative embodiment of a connection between the wing support and the (motor-generator) machine in accordance with some aspects of the present invention.
Figure 7B:
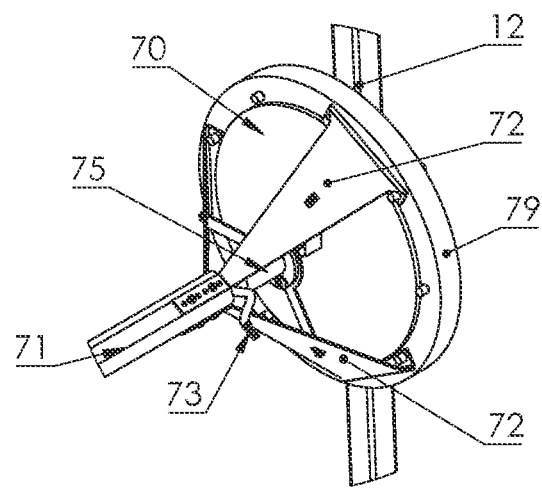
FIG. 7B shows a perspective view of the connection between the wing support and the machine of FIG. 7A.

As for attaching the first wing support 12 to the machine 70, FIGS. 7A and 7B show an illustrative embodiment for operatively coupling the first wing support 12 to a synchronous PM motor wheel or machine 70. Those of ordinary skill in the art can appreciate that selecting a synchronous PM motor wheel as the machine 70 is for illustrative purposes only and the invention is not to be construed as being limited thereto. Indeed, other motor-generator machine types may be used and all are within the scope of the present invention.

The synchronous PM motor wheel (machine 70) is a synchronous motor that uses a magnetic field created by a plurality of permanent magnets, e.g., disposed on an annular ring 79, held by braces 72. A slip ring 75 may be provided, e.g., between the armature 71 and a rotor arm 78, for adjusting resistance for allowing free rotation of the rotor 78 with windings and decoupling rotating windings from the stationary power cable 73. A power cable 73 may be provided to transmit the induced electricity to a load, to a power grid, and/or to a power-storage device. The workings of the machine 70 may be housed in and supported by an annular ring 79 that is supported by a number of braces 72.

The aforementioned rotor arm 78 may be releasably attached to the first wing support 12, e.g., via an opening located at a centroid of the wing support 12 and/or at a midpoint between the points of attachment of the cable ends, using a fastening device 77, e.g., bolts. In some implementations, the rotor arm 78 is coupled to the armature 71, e.g., via the slip ring 75, so that when the rotor arm 78 is made to rotate by the rotating first wing support 12, the armature 71 does not rotate. The changing magnetic field generated by the plurality of permanent magnets, induces current, generating power.

In a next step, the flexible wings 20 may be exposed to the flowing fluid to drive the machine 70. As the wings 20 rotate, in some variations, the method may include orienting and/or balancing the flexible wings 20, e.g., by disposing a balancing cable 28 through an aperture 34 proximate a leading edge 31 of each airfoil-shaped profile 30 in the flexible wings 20, and transferring torque to the machine, e.g., using the cables 26, 24 disposed through respective apertures 35, 36 in each airfoil-shaped profile 30. At least one rigid strut 16 disposed between the flexible wings 20 supports the flexible wings and stabilizes the system. In low ambient flow conditions, the machine 70 can be operated briefly as a motor, to bring the system 60 up to a minimum rotational speed, after which the wings 20 are sufficiently flexed and loaded, that rotation is sustained by the ambient flow and the machine 70 may be switched to operate as a generator.

Physics and Design Parameters

Systems with flexible wings and balanced cables may behave similarly to a single wire connecting two wheels. As previously mentioned, torque transfer for a single tensioned wire can be approximated as $(H/L)*R^2*\sin(\alpha)$. In this approximation the horizontal tension force (H) may be assumed to be constant in certain fixed operating conditions, which is not always true, e.g., due to cable elongation and different loads. At small displacement angles, e.g., less than or equal to about 30 degrees, however, the assumption is more correct as H is almost constant for selected angular velocities, wind speeds, and rotor positions, and mostly dominated by pretension and/or centrifugal forces. To estimate required strength it may be useful to use the maximum force that appears when wing is perpendicular to wind flow.

By coupling a rigid strut to the span centers of the flexible wing and of the balancing cable, transferred torque from one side to another may be approximated by the equation:

$$\text{Torque} = H/L * R^2 * \sin(\alpha/2).$$

A Darrieus blade may operate well in a radius range at which the speed of blade is at least 2.5 times the rotor tip speed. However, high drag may be produced at extreme angles of attack, which may be estimated using the following equation:

$$\text{Angle of Attack} = \arctan[\sin(\varphi)/(\lambda + \cos(\varphi))],$$

in which where $\lambda$ is tip speed ratio. Accordingly, in extreme instances, i.e., when $\varphi = 90$ degrees, the angle of attack may equal $\arctan[1/\lambda]$.

For a flexible wing, the maximum wing radius, $R_{max}$, may operate at 4.5 to 5 times the tip speed ratio, with the minimum wing radius, $R_{min}$, equal to about $R_{max}/2$. Although, in some applications, $R_{min}$ may be less than about $R_{max}/2$, e.g., $R_{min}$ may instead equal about $R_{max}/3$, because the flexible wing does not produce any power, only drag, until it reaches at least $R_{min}$. Fixing $R_{min} = R_{max}/2$ may be conservative.

The design length of the flexible wings may be influenced by a tradeoff between swept area, torque transfer, and the ratio of tension force versus centrifugal force. For example, it may be desirable to assume a tension force that is about 1.2 times larger than centrifugal force. Using this relationship for a tension force 1.2 times larger than centrifugal force, the design length (L) may be estimated using the following equation:

$$L = 10*(R_{max} - R_{min}) = 10*(R_{max} - R_{max}/2) = 5*R_{max},$$

which provides a good material use for the cables but a relatively small swept area. At the high end, e.g., where tension force may be about 2.4 times the centrifugal force (e.g., due to a light-weight blade), the design length (L) may be estimated using the following equation:

$$L = 20*(R_{max} - R_{min}) = 20*(R_{max} - R_{max}/2) = 10*R_{max}.$$

If the tension force may be about 2 times the centrifugal force, the design length (L) may be estimated using the following equation:

$$L = 16*(R_{max} - R_{min}) = 16*(R_{max} - R_{max}/2) = 8*R_{max}.$$

Assuming $L/R_{max} = 8$, i.e., tension force equals twice the centrifugal force, the formulae for torque transfer become:

$$\text{Torque Transfer} = H*R_{max}*\sin(\alpha/2)/8 \text{ (with a central rigid strut) or}$$

$$\text{Torque Transfer} = H*R_{max}*\sin(\alpha/2)/32 \text{ (without a central rigid strut).}$$

Simplifying the equations using the small-angle approximation, i.e., $\sin(\alpha/2)$ is approximately equal to $\alpha/2$ (in radians), one may conclude that adding a central rigid strut increases torque transfer capability by a factor of four for the same displacement angle. Hence, the system may become more efficient by adding a single rigid strut. Additional rigid struts (beyond one) add weight, cost, and aerodynamic drag, while making torque transfer slightly more efficient.

In order to estimate the magnitude of power that can be transferred via such a system, centrifugal force ($F_c$) may be estimated using the equation:

$$F_c = 5/6*m*\omega^2*R_{max},$$

in which $\omega$ is a rotational speed (in radians/second) and m is mass (in kg). The constant 5/6 corresponds to a parabolic approximation of the offset of the center of mass when $R_{min} = R_{max}/2$. Accordingly, tension force (H) may be calculated using the equation:

$$H = 2*F_c = 5/3*m*\omega^2*R_{max}.$$

Accordingly, power transferred (P) may be estimated using the equation:

$$P_1 = \omega*H*R_{max}*\sin(\alpha/2)/8 = 5/24*m*\omega^3*R_{max}^2*\sin(\alpha/2).$$

Limitations of rotational speed, $\omega$, may be given in terms of $\lambda$ (i.e., tip speed ratio), and external wind speed, v, using the definition:

$$\lambda = \omega*R/v.$$

For a Darrieus-type turbine, one of best rotor solidity ratios, i.e. chord length to $R_{max}$, for a single wing is approximately 0.21 (e.g., for NACA-0012 family of profiles) and an optimal tip speed ratio ($\lambda$) is in the range of 4 (worst case) to 5 (best case). Substituting the worst case tip speed ratio into the above equation, $\omega=4*v/R_{max}$. Substituting this angular velocity into the power equation above results in:

$$P_1 \geq [40/(3*R_{max})]*m*v^3*\sin(\alpha/2),$$

corresponding to the power transferred from one wing support to another one. If power is sourced and distributed evenly on each wing of a dual-wing system, the generated power may be roughly twice that amount, i.e., $2P_1$.

Assuming that the shape of the path of the flexible wing may be approximated by a parabola, the swept area may be calculated using the equation:

$$\text{Swept Area}=2/3*L*(2*R_{max}+R_{min}).$$

For $R_{min}=R_{max}/2$ and $L=8*R_{max}$, $$\text{Swept Area}=40/3*R_{max}^2.$$

The maximum power extracted by turbine may be estimated using the equation:

$$P_2=1.225*0.5*0.4*v^3*(40/3*R_{max}^2)$$

in which v is wind speed, 1.225 is an air density at sea level, 0.4 is a coefficient of efficiency, and 0.5 is a coefficient derived from the kinetic energy relationship. Equating $2P_1$ to $P_2$, $$2*[40/(3*R_{max})]*m*v^3*\sin(\alpha/2)=1.225*0.5*0.4*v^3* (40/3*R_{max}^2), \text{ or}$$

$$2*m*\sin(\alpha/2)=1.225*0.5*0.4*R_{max}^3,$$

which suggests that, at a given angle of displacement ($\alpha$), transferred power may depend on the selected radius and mass, but not on wind speed (v). This allows a designer, especially in a multi-bladed configuration, to select a displacement angle ($\alpha$) to ensure stability and generate smooth torque, e.g., as is possible with Gorlov's turbines and quiet revolution turbines, without having to design for a particular wind speed.

Thus, the minimal mass required to transfer torque for a given displacement angle may be determined by the general equation:

$$m=0.1225*R_{max}^3/\sin(\alpha/2).$$

Recalling that, for maintaining the centrifugal force higher than aerodynamic force, the mass per length of wing is equal to $0.13*R_{max}^2$. Hence, for a wing length of $8*R_{max}$:

$$m=(8*R_{max})*0.13*R_{max}^2=1.04*R_{max}^3.$$

Setting these two equations equal to one another and solving for the displacement angle ($\alpha$), $\alpha$ is approximately equal to 13.5 degrees.

Accordingly, for a 6-meter maximum wing radius, the mass of the flexible wing may weigh about 225-kg and the length may be about 48 meters, which may produce tension forces of approximately 16 kN at a wind speed of 4 meters/second (m/s) and of about 100 kN at a wind speed of about 10 m/s, assuming, of course that the tip speed ratio is maintained.

With a flexible wing and balancing cable combination, tension forces produced at the supports may be doubled, e.g., because the balancing cable would resist stretching. However, allowing the displacement angle to increase allows the mass to decrease and, consequently, tension forces. A common pitfall to designers includes aerodynamic balance and gusts. For example, flexible wings must maintain their trajectory against gusts, which may impose some limitations on possible mass reduction. A mass limitation of $0.13*R_{max}^2$ per length of wing maintains wing trajectory only at nominal speeds, not with gusting.

A table of select design parameters and exemplary values or ranges is provided in FIG. 9.

Comparison to Darrieus-Type Vertical Axis Wind Turbines and Propeller-Type Horizontal Axis Wind Turbines The system described herein may significantly outperform previously known Darrieus-type vertical axis wind turbine in terms of material costs. It is also widely known that a propeller-type design, especially for large swept areas, may outperform vertical axis wind turbines. An exception being certain niche devices, whose specific performance requires capturing wind from all directions, e.g., on roofs in urban locations.

Using the same assumptions, i.e., $R_{min}=R_{max}/2$ and $L=8*R_{max}$, the swept area may be approximately $13.3*R_{max}^2$. Thus, a propeller-type turbine with an equivalent swept area may require a radius equal to the square root of $13.3/\pi$. Hence, a comparable radius for a propeller may be roughly twice as large as the flexible wing or, the same radius, may require four propellers instead of a single flexible wing.

Because these propellers capture most of their energy at the perimeter of their rotation, rather than in a central line at the top of the supports, the propeller may be moved higher and, thus, the support must be taller. If we compare this design of a 6-meter $R_{max}$ radius on a 12-meter support, to get an equivalent result with two propellers on two supports their radii should be about 8.5 meters. Furthermore, the height of the support may range between about 15 meters (to provide a 6 meter clearance in an agricultural setting) and about 18 meters (to maintain a 9-meter stand-off where wind energy harvesting starts). In the case of a single propeller blade, the blade length may need to be about 12 meters in length and the support height may range between about 18 and 21 meters to maintain acceptable clearances and efficiencies.

Construction of the supports may scale closer to the square of their height and the cube of radii of the rotor. Hence, taller support requirements may increase support costs by between 1.3 and 1.8 times, depending also on a log wind profile. For example, in terrains where an exemplary wind is considerably slower at 10 meters above the ground surface than at 20 meters, e.g., terrain having high surface roughness, a greater height for the propeller and a taller support may be more beneficial.

Propeller blades are complex, as these should be rigid elongate structures that resist buckling and bending. Practical 3-bladed propellers with 12-meter blades may have a tip speed ratio of about 7. The weight of a single blade may be about 750 kg, e.g., using advanced composite materials. Thus, the total weight would be about 2.2 metric (or long) tonnes for the entire rotor. Compared to the weight and costs for a flexible wing of 225 kg, the weight of the latter is negligible. Moreover, support design and design for a rotor must take into account the more significant blade weight. Flexible wings according to the invention may also be rolled into a compact configuration for ease of transport and installation. This is clearly not the case for rigid propellers and other rigid wings, that require unitary construction or, in some cases, multiple linked elements, adding weight and cost.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The features and functions of the various embodiments may be arranged in various combinations and permutations, and all are considered to be within the scope of the disclosed invention. Accordingly, the described embodiments are to be considered in all respects as only illustrative and not restrictive. Furthermore, the configurations, materials, and dimensions described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A troposkein-type flexible wing adapted to rotate about a substantially horizontal axis for generating power, the flexible wing comprising:
    a plurality of airfoil-shaped profiles, each airfoil-shaped profile having a gravitational center of mass, an aerodynamic center, and at least one opening formed therethrough;
    a membrane covering the plurality of airfoil-shaped profiles; and
    a cable disposed through a first opening formed in each airfoil-shaped profile in at least one of a leading edge and proximate the leading edge of each airfoil-shaped profile, such that the gravitational center of mass of each airfoil-shaped profile is coincident with the aerodynamic center.

2. The flexible wing of claim 1, wherein the flexible wing is arcuate-shaped.

3. The flexible wing of claim 1, wherein the cable extends internal to and along an entire length of the flexible wing.

4. The flexible wing of claim 1, wherein a center-to-center distance between adjacent airfoil-shaped profiles within the flexible wing varies.

5. The flexible wing of claim 4, wherein the center-to-center distance between adjacent airfoil-shaped profiles at a mid-span of the flexible wing is greater than the center-to-center distance between adjacent airfoil-shaped profiles proximate a wing support.

6. The flexible wing of claim 1, wherein at least one airfoil-shaped profile is smaller in at least one dimension than another airfoil-shaped profile.

7. The flexible wing of claim 1, wherein the cable comprises a balancing cable disposed through the first opening of each airfoil-shaped profile.

8. The flexible wing of claim 1 further comprising a pair of openings formed in each airfoil-shaped profile, on either side of and substantially equidistant from the aerodynamic center.

9. The flexible wing of claim 8 further comprising a pair of cables disposed through respective openings of the pair of openings in each airfoil-shaped profile,
    wherein a first cable of the pair of cables is disposed in a corresponding second opening proximate the gravitational center of mass of each airfoil-shaped profile.

10. The flexible wing of claim 9, wherein a second cable of the pair of cables is preferentially located in a corresponding third opening towards a leading edge of each airfoil-shaped profile.

11. The flexible wing of claim 10, wherein the third opening is formed within a range of up to about three (3) percent of a chord length closer to the leading edge of each respective airfoil-shaped profile than a location equidistant from the aerodynamic center as the gravitational center of mass.

12. The flexible wing of claim 9, wherein respective first ends of each of the pair of cables are operatively coupled to a proximal end of a first flexible wing support and respective second ends of each of the pair of cables are operatively coupled to a proximal end of a second flexible wing support.

13. The flexible wing of claim 12, wherein the first flexible wing support is releasably coupled to a bearing assembly.

14. The flexible wing of claim 13, wherein the bearing assembly comprises:
    a first bearing portion rotatably attached to the first flexible wing support;
    a second bearing portion fixedly attached, by a non-rotatable shaft, to a vertical support; and
    a rotatable shaft operatively disposed between the first and the second bearing portions, wherein the rotatable shaft is:
        rotatably attached to the first bearing portion, and
        operatively disposed within a bearing race attached to the second bearing portion.

15. The flexible wing of claim 12, wherein the respective first ends of each of the pair of cables are operatively coupled to a first bar that is fixedly attached to the first flexible wing support and the respective second ends of each of the pair of cables are operatively coupled to a second bar that is fixedly attached to the second flexible wing support.

16. The flexible wing of claim 12, wherein at least one of the first flexible wing support and the second flexible wing support is operatively coupled to a power-generating machine.

17. The flexible wing of claim 16, wherein the power-generating machine is at least one of a synchronous permanent magnet machine, a gearbox for the synchronous permanent magnet machine, a non-synchronous permanent magnet machine, and a gearbox for the non-synchronous permanent magnet machine.

18. The flexible wing of claim 1, wherein a discrete airfoil-shaped profile comprises an aperture for receiving a fastening device to releasably attach a strut to the flexible wing.

19. The flexible wing of claim 18, wherein the aperture is formed in the discrete airfoil-shaped profile in at least one of at and proximate the aerodynamic center.

20. The flexible wing of claim 1, wherein each airfoil-shaped profile further comprises:
    a trailing edge;
    an upper peripheral surface; and
    a lower peripheral surface.

21. The flexible wing of claim 20, wherein the profile comprises a structural truss.

22. The flexible wing of claim 20 further comprising an aperture for receiving a fastening device to releasably attach a strut to the profile.

23. The flexible wing of claim 22, wherein the aperture is formed in at least one of the aerodynamic center and proximate the aerodynamic center.

* * * * *